Patented Jan. 13, 1942

2,269,825

UNITED STATES PATENT OFFICE 2,269,825

ALKANOL AMINE DERIVATIVE OF IRON CARBONYL AND COMPOSITION COMPRISING SAME

William K. McPherson, Ames, Iowa, and Leo M. Christensen, Miller, Nebr., assignors to The Dow Chemical Company, Midland, Mich., a corporation of Michigan No Drawing. Application July 19, 1939, Serial No. 285,356

5 Claims. (Cl. 44—9)

This invention concerns certain new derivatives of iron carbonyl prepared by reacting the latter with alkanol amines, and it also concerns compositions comprising such new derivatives.

The new reaction products provided by the invention are prepared by reacting an alkanol amine, e. g. monoethanol amine, diethanol amine, triethanol amine, propanol amine, dipropanol amine, tripropanol amine, butanol amine or pentanol amine, etc., with a liquid iron carbonyl, preferably iron pentacarbonyl. The reaction is carried out at temperatures not exceeding 290° C., preferably between 60° C. and 150° C., at atmospheric, subatmospheric, or superatmospheric pressure, but the nature of the reaction product varies depending upon the pressure employed. When the reaction is carried out at pressures not greatly exceeding atmospheric under conditions such that any carbon monoxide formed may escape from the reaction mixture, then the alkanol amine apparently displaces carbon monoxide from the iron carbonyl molecule. The course of such reaction is illustrated by the following equation for the reaction of iron pentacarbonyl with diethanol amine at atmospheric pressure:

(1) $Fe(CO)_5 + HN(-CH_2CH_2OH)_2 \rightarrow$
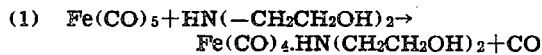
$Fe(CO)_4.HN(CH_2CH_2OH)_2 + CO$ When the reaction is carried out under pressure, i. e. in a bomb or autoclave, so that the carbon monoxide may not escape from the mixture then the greater part of the carbon monoxide remains combined in the reaction product and the alkanol amine apparently forms an addition compound with the initial iron carbonyl. The course for this reaction is illustrated by Equation 2 for the reaction of iron pentacarbonyl with diethanol amine at superatmospheric pressure.

(2) $Fe(CO)_5 + HN(-CH_2CH_2OH)_2 \rightarrow$
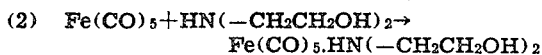
$Fe(CO)_5.HN(-CH_2CH_2OH)_2$ Regardless of whether or not superatmospheric pressure be employed, the mixture turns red as the reaction progresses and the product is of deep red color.

The reaction is carried out by mixing the iron carbonyl and alkanol amine in any desired proportions, usually in the proportion of between 1 and 5 moles of alkanol amine per mole of iron carbonyl, and preferably in approximately equimolecular proportions, and heating the mixture until reaction occurs. A mutual solvent for the alkanol amine and the iron carbonyl reactant may advantageously be present, since the alkanol amines and iron carbonyl are insoluble, or only sparingly soluble, in one another and the presence of such solvent is usually required in order to obtain smooth reaction. Examples of solvents suitable for employment are methanol, ethanol, isopropanol, normal propanol, butanol, pentanol, ethylene glycol, acetone and diethyl ether. The solvent is added to the initial reaction mixture in a proportion sufficient to give a homogeneous mixture after which the mixture is heated at atmospheric pressure or in a bomb or autoclave until the reaction is complete. In the presence of such solvent, the reaction frequently starts at room temperature or only slightly above, but it is preferably carried to completion at temperatures between 60° C. and 110° C.

As hereinbefore stated the reacted mixture comprising the iron carbonyl-alkanol amine reaction product is a liquid of deep red color. This product is suitable for direct use as an agent for stabilizing iron pentacarbonyl against decomposition by light. It may also be employed as an addition agent to motor fuels, e. g. gasoline. When used for this latter purpose, it performs the dual functions of increasing the octane number of the motor fuel and at the same time of stabilizing the fuel against the gum formation which normally occurs during storage. If desired, the reaction product may be employed in small proportions along with iron pentacarbonyl as such addition agent to motor fuels, in which case it performs the further function of stabilizing the iron pentacarbonyl against decomposition by light so that the treated motor fuel may be stored and utilized over considerable periods of time without suffering appreciable deterioration.

It will be understood that instead of employing the crude product of the reaction between iron carbonyl and an alkanol amine for the purposes just mentioned, the product of said reaction may first be purified and then used for the same purposes. However, purification of such product is difficult and unnecessary since the crude reaction mixture is entirely satisfactory.

The following examples illustrate certain ways in which the principle of the invention has been applied, but are not to be construed as limiting the invention.

Example 1

Iron pentacarbonyl and triethanol amine were mixed in equimolecular proportions and sufficient ethanol was added to give a homogeneous mixture. The resultant mixture was boiled under reflux for 0.5 hour, during which time approximately one molecular equivalent of carbon monoxide was evolved and the mixture became red. The mixture was cooled and added in small proportion to gasoline. It was found that the product was sufficiently soluble in the gasoline to raise the octane number of the latter from 56 to 85. The treated gasoline was stable under exposure to light (i. e. there was no precipitation of iron compounds such as occurs when gasoline containing iron pentacarbonyl alone is exposed to light), and it was also found to be relatively stable as compared with the untreated gasoline against gum formation.

Example 2

Equimolecular proportions of diethanol amine and iron pentacarbonyl were reacted, the procedure being similar to that described in Example 1. During the reaction carbon monoxide was evolved and the mixture turned red. The product was found to be similar in properties to that described in Example 1.

Example 3

Monoethanol amine and iron pentacarbonyl were reacted as in Example 1, the mixture again turning red as the reaction progressed and carbon monoxide being evolved. The product was similar in properties and was adapted to the same uses as that described in Example 1.

Example 4

A mixture of iron pentacarbonyl and triethanol amine in equimolecular proportions was treated with ethanol in amount sufficient to give homogeneity. The mixture was then charged into a bomb and heated with agitation at a temperature of about 100° C. for approximately 2 hours. The bomb was then cooled and opened. There was very slight gas pressure in the bomb, when opened, indicating that practically all of the carbon monoxide contained by the initial iron pentacarbonyl reactant had been retained in the product. The reacted mixture was a liquid of deep red color. It is effective both as an addition agent for stabilizing iron pentacarbonyl against decomposition by light, and also as an addition agent for increasing the octane number and decreasing the gumming tendency of gasoline.

Example 5

A sample of iron pentacarbonyl alone and another sample of iron pentacarbonyl which contained about 10 per cent by weight of the iron carbonyl-triethanol amine reaction product described in Example 1 were exposed to daylight. After one hour of exposure the initially pure iron pentacarbonyl was partially decomposed, as was evidenced by the presence of a heavy precipitate therein. After one week of exposure, the sample containing the iron carbonyl-triethanol amine reaction product remained as a clear red liquid containing no precipitate.

Other modes of applying the principle of the invention may be employed instead of those explained, change being made as regards the method or compositions herein disclosed, provided the steps or ingredients specified in any of the following claims or the equivalent of such stated steps or ingredients be employed.

We therefore particularly point out and distinctly claim as our invention:

1. A liquid composition comprising iron pentacarbonyl and, as an agent for stabilizing the latter against decomposition by light, the product of the reaction of iron pentacarbonyl with an alkanol amine, which reaction product contains an iron carbonyl radical and an alkanol amine radical chemically combined in the same molecule.

2. A liquid composition comprising iron pentacarbonyl and, as an agent for stabilizing the latter against decomposition by light, the product of the reaction of iron pentacarbonyl with alkanol amine under conditions such that carbon monoxide also is formed, which reaction product contains an iron carbonyl radical and an alkanol amine radical chemically combined in the same molecule.

3. A liquid motor fuel comprising minor proportions of iron pentacarbonyl and the product of the reaction of iron pentacarbonyl with an alkanol amine, which reaction product contains an iron carbonyl radical and an alkanol amine radical chemically combined in the same molecule.

4. A liquid motor fuel comprising gasoline, iron pentacarbonyl, and a product of the reaction of iron pentacarbonyl with an alkanol amine, which reaction product contains an iron carbonyl radical and an alkanol amine radical chemically combined in the same molecule.

5. A liquid motor fuel comprising gasoline, iron pentacarbonyl, and a product of the reaction of iron pentacarbonyl with an alkanol amine under conditions such that carbon monoxide also is formed, which reaction product contains an iron carbonyl radical and an alkanol amine radical chemically combined in the same molecule.

WILLIAM K. McPHERSON.
LEO M. CHRISTENSEN.